(12) United States Patent
Püskül

(10) Patent No.: US 11,448,758 B2
(45) Date of Patent: Sep. 20, 2022

(54) METHOD AND DEVICE FOR OPTICAL DISTANCE MEASUREMENT

(71) Applicant: Ibeo Automotive Systems GmbH, Hamburg (DE)

(72) Inventor: Özgür Püskül, Hamburg (DE)

(73) Assignee: Ibeo Automotive Systems GmbH, Hamburg (DE)

(*) Notice: Subject to any disclaimer, the term of this patent is extended or adjusted under 35 U.S.C. 154(b) by 659 days.

(21) Appl. No.: 16/546,783

(22) Filed: Aug. 21, 2019

(65) Prior Publication Data
US 2020/0064472 A1    Feb. 27, 2020

(30) Foreign Application Priority Data
Aug. 23, 2018 (EP) .................................. 8190430

(51) Int. Cl.
| | |
|---|---|
| *G01S 17/10* | (2020.01) |
| *G01C 3/02* | (2006.01) |
| *G01S 17/08* | (2006.01) |
| *G01S 17/89* | (2020.01) |
| *G01S 7/484* | (2006.01) |
| *G01S 7/486* | (2020.01) |

(52) U.S. Cl.
CPC .............. *G01S 17/10* (2013.01); *G01C 3/02* (2013.01); *G01S 17/08* (2013.01); *G01S 17/89* (2013.01); *G01S 7/484* (2013.01); *G01S 7/486* (2013.01)

(58) Field of Classification Search
CPC . G01C 3/02; G01S 17/08; G01S 17/10; G01S 17/86; G01S 17/89; G01S 17/931; G01S 7/484; G01S 7/486
See application file for complete search history.

(56) References Cited

U.S. PATENT DOCUMENTS 7,940,377 B1 * 5/2011 Schmitt ................. G01J 3/0208
356/3.01

OTHER PUBLICATIONS

A. Lazarov and C. Minchev, "ISAR technique for stealth target detection and image reconstruction," First European Radar Conference, 2004. EURAD., 2004, pp. 57-60.*

* cited by examiner

*Primary Examiner* — Mohammed S Rahaman
(74) *Attorney, Agent, or Firm* — Kelly & Kelley, LLP

(57) ABSTRACT

The invention relates to a method for optical distance measurement which includes the steps of emitting measurement pulses by a transmission unit and receiving measurement pulses reflected by an object by a receiver unit to identify objects within a field of view of the receiver unit. A background signal is received by receiver elements and the intensity of the background signal is determined for each receiver element, wherein the determined intensities of the background signal are compared in order to identify objects not identified by the measurement within the field of view of the receiver unit. At least one region of minimal intensity of the background signal is established within an intensity image of the field of view of the receiver unit. The region of minimal intensity is assigned a masking in the field of view, the masking originating from an object not identified by the measurement.

11 Claims, 5 Drawing Sheets

METHOD AND DEVICE FOR OPTICAL DISTANCE MEASUREMENT

CROSS-REFERENCE TO RELATED APPLICATIONS

A claim for priority under 35 U.S.C. § 119 is made to European Patent Application No. 18190430.1 filed Aug. 23, 2018, in the European Patent Office, the entire contents of which are hereby incorporated by reference.

FIELD OF THE INVENTION

The invention relates to a method and a device for optical distance measurement.

PRIOR ART

Optical distance measurements, in particular for use in the driverless navigation of vehicles, are known from the prior art. They are based on the time-of-flight principle in which a scanning sensor is used for measurement, in particular a LIDAR (abbreviation for "light detection and ranging") sensor, which emits measurement pulses which are reflected by objects, and the reflected measurement pulses are detected. The distance from the objects can be indicated by determining the time of flight of the measurement pulses from the sensor to the objects and back and using the speed of light.

However, LIDAR sensors known from the prior art are not capable of sensing all objects. For example, objects can have a low remission. This means that emitted measurement pulses can hardly be reflected by them, and therefore the reflected measurement pulse is no longer received. Such objects can hardly be detected or cannot be detected as a result. In the prior art, it is usual to declare regions in which no objects have been identified as free space. However, an erroneous free space marking can lead to a dangerous misjudgment of the situation, in particular if there is in fact an object with low remission in the region marked as free space.

Presentation of the Invention: Problem, Solution, Advantages

The present invention addresses the problem of developing a method and a device for distance measurement such that the probability of identifying objects with low remission is considerably increased.

The aforementioned problem is solved by a method for optical distance measurement which comprises carrying out at least one measurement, a measurement comprising emitting measurement pulses by means of a transmission unit and receiving measurement pulses reflected by an object by means of a receiver unit to identify objects within a field of view of the receiver unit. The receiver unit comprises receiver elements; the method according to the invention comprises receiving a background signal by means of the receiver elements of the receiver unit. For each receiver unit, an intensity of the background signal is determined, and the intensities determined are compared to identify objects which have not been identified by means of the measurement within the field of view of the receiver unit. At least one region of minimal intensity of the background signal is established within an intensity image of the field of view of the receiver unit, the at least one region of minimal intensity being assigned a masking, originating from an object not identified by means of the measurement, in the field of view of the receiver unit.

An optical distance measurement is characterised in that distances are determined using optical signals, in this case optical measurement pulses. The distance covered by the measurement pulse is the length between the transmission unit which emitted the measurement pulse and the object which reflected said measurement pulse plus the length between the object and the receiver unit which received the corresponding reflected measurement pulse. The reflected measurement pulses are each backscattered signals of the emitted measurement pulses. In other words, the measurement pulses reflected by an object are measurement pulses which have been emitted previously with the aid of the transmission unit.

In detail, the transmission unit comprises multiple transmission elements, and the receiver unit comprises multiple receiver elements. The distance covered is in particular the length between the corresponding transmission element and the object and between the corresponding receiver element and the object. Since the at least one object is typically a three-dimensional object and therefore some regions of the object can be closer and other regions of the object can be further away, the term distance from the object means the distance from at least one point of the object, that is, the point at which the measurement pulse hits and is reflected. Time of flight means the time which the measurement pulse has taken for the above-described distance. The method is preferably used for distance measurement for use in the driverless navigation of a vehicle. For this, the distances from all objects within a measurement region, preferably within a field of view, of the transmission unit and/or receiver unit are determined. Advantageously, the method is a LIDAR method, preferably a scanning one.

A measurement preferably comprises the emission of measurement pulses by means of the transmission unit. A measurement pulse is in particular an optical, in particular electromagnetic, signal. The measurement pulse preferably has a wavelength which does not originate from the range visible to the human eye. For safety reasons, invisible infra-red is preferably used. Preferably, a measurement pulse has a pulse duration, and therefore the measurement pulse can be understood as a time-limited portion of electromagnetic radiation. Since the measurement pulse is an electromagnetic signal and therefore the speed of the measurement pulse is known, the time of flight of a measurement pulse and the speed of light can be used to indicate the distance the measurement pulse has covered during the time of flight. Preferably, multiple measurements are carried out; in particular, a transmission element emits at least one measurement pulse, in particular a sequence of measurement pulses, during one measurement.

The transmission unit is in particular a transmission matrix. The term "transmission matrix" in particular means an array of transmission elements. Accordingly, the receiver unit is preferably a receiver matrix, i.e. in particular an array of receiver elements. A matrix is preferably understood as a three-dimensional, in particular planar, body, on one surface of which the corresponding elements, transmission elements or receiver elements, are arranged. Preferably, the transmission elements are each a laser, and therefore the transmission matrix can be understood as a laser array. The receiver elements are preferably formed by diodes, in particular avalanche photodiodes, most preferably single-photon avalanche diodes, or pin diodes. The receiver elements are in particular pixels, and therefore the receiver unit is a pixel array.

The emission of the measurement pulses and the reception of the reflected measurement pulses are used to identify objects within a field of view of the receiver unit. In particular, the method comprises identifying objects with the aid of the measurements. In particular, the method, preferably a device for carrying out the method, can be assigned a "measurement region" from which reflections of the emitted measurement pulses are received. Preferably, a device with which the method for optical distance measurement is carried out can carry out measurements within the measurement region. The measurement region is defined by a field of view and a range. The range defines a maximum distance region which extends continuously in the beam propagation direction from a device for distance measurement. The maximum range thus defines the maximum distance from which reflections from objects can be expected. The field of view is spanned by two angular sectors in two planes which can in particular be perpendicular to each other. In one of these planes, i.e. two-dimensionally, the field of view can be understood as an angular sector. That is to say a circular sector without limitation by a circular arc. In other words, the angular sector is delimited only by two circular radii starting from the device. Three-dimensionally, the field of view forms a pyramid extending infinitely in the beam propagation direction. This infinitely long pyramid is limited in height by the range, forming the measurement region. The field of view and the range can be technically limited or specified by definition.

Objects within the field of view of the receiver unit are preferably determined by the emission and reception of the corresponding reflections of measurement pulses. By establishing the time of flight, the distance from a device for carrying out the method can also be established, and therefore the exact position of the determined objects within the measurement region can be determined.

According to the invention, objects not identified on the basis of the measurement pulses can be identified by receiving a background signal by means of the receiver elements.

The background signal is in particular background illumination, in other words a background light. In particular, the background signal comprises all the electromagnetic radiation, preferably light, which is sensed by the receiver elements and has not been emitted previously by means of the transmission unit. The background signal can also be interpreted as an interference signal. In contrast to the measurement pulses, the background signal is not understood as a time-limited portion of electromagnetic radiation but as a continuous signal. The background signal should be received at least at a similar strength, i.e. at a similar intensity, by all the receiver elements of the receiver unit unless it is masked by an object. This principle is used to identify objects which are not identified with the aid of the measurements. In particular, the background signal is not filtered. In other words, the background signal is received unfiltered by means of the receiver elements.

Preferably, the background signal originates from sources other than the transmission unit. The background signal comprises in particular interfering light influences. These include, for example, the sun, vehicle tail lights and headlights, and other artificial light sources. In other words, the background signal is noise. Such noise is typically filtered and thus suppressed in the prior art. However, in this case the background signal is preferably deliberately used unfiltered in order to obtain information which cannot be obtained by means of the measurement about objects in the field of view of the receiver unit.

For each receiver element, an intensity of the background signal is determined, and the determined intensities of the background signal are compared to identify objects which have not been identified by means of the measurement within the field of view of the receiver unit. In particular, the received background signal is checked for inhomogeneities. An inhomogeneity means an inhomogeneity in the intensity of the background signal in relation to the receiver elements. Each receiver element can preferably be assigned a region of the field of view. Each receiver element can thus be assigned an angular sub-sector of the field of view. If there is an object in the field of view of the receiver element, the background signal is masked and thus reduced, since the object screens the background signal. The background signal sensed by the corresponding receiver element falls correspondingly. A comparison of the intensities of the receiver elements allows masking in the field of view of the receiver unit to be established. This masking must originate from an object which has not been detected by the measurements, for example owing to a low remission, since the measurement pulses reflected by the object are lost in the background signal, in other words, in the noise. According to the invention, this object can still be identified, and therefore the likelihood of identification and the precision of the marking of free space within the field of view of a receiver unit are considerably improved. Furthermore, the range can be improved, since, at a very long distance from the device, objects with a remission which would not be sufficient for object identification by means of the measurement at this distance can still be identified.

Preferably, the intensity of the background signal is accumulated per receiver element in order to generate the intensity image of the field of view of the receiver unit. In particular, the received intensity of the background signal per receiver element is accumulated for a defined time portion.

By the accumulation of the intensity per receiver element, an intensity of the background signal per receiver element is preferably determined.

On the basis of the determined intensities per receiver element, the intensity image of the field of view of the receiver unit is preferably generated. The intensity image shows the determined intensity per receiver element optically. In particular, the intensity image reproduces the receiver unit optically by assigning a box of the intensity image to each receiver element. At least one region with minimal intensity of the background signal is established within the intensity image. Minimal should be understood in comparison with other regions of the intensity image.

Advantageously, regions with minimal intensity are each assigned a masking in the field of view of the receiver unit, the masking originating from an object not identified by means of the measurement. In particular, such a masking is assigned to all regions with minimal intensity. A masking means a shadow region of the background signal, caused by the object, in the direction of the device or receiver unit, preferably in the beam propagation direction of the background signal.

After the intensity image has been created and the intensities of the receiver units have been compared in order to identify objects not identified by means of the measurement, a new, i.e. current, intensity per receiver element can be determined in order to generate a new, i.e. current, intensity image.

Preferably, the method also comprises assigning an object, that is, an object not identified by means of the measurement, to a masking in the field of view. Objects, preferably objects not identified by means of the measurement, are identified in this manner. Although no backscattered signal from a masked object is detected by means of the measurement, it is thus possible to identify objects by viewing the background signal within a receiver unit and checking it for an inhomogeneity in the detected intensity.

Advantageously, the method can comprise an analysis of the background signal. Preferably, the background signal is analysed unfiltered. A corresponding analysis and/or characterisation of the background signal can preferably be used to infer more precisely, from a region with minimal intensity or from a masking, the exact dimensions of the object which has caused same. In contrast to an identification of objects by means of measurements, an identification of objects by comparing the intensity of the background signal in relation to the receiver elements can be used to indicate the position of the object within the field of view, but not the position of the object in relation to the distance from the device. In particular, an analysis of the background signal, further preferably a characterisation of the background signal, can be used in this case to determine more information about the sources of the background signal and the position thereof and thus to establish a more precise indication of the object position within the measurement region of the receiver unit. For the analysis, the knowledge that fewer noise points occur around objects detected by means of the measurement can preferably be used, and therefore a noise analysis can lead to better findings with regard to where the object actually is. Furthermore, an analysis of the background signal can also be used for further features for object identification. Overall, the information obtained from the background signal can be used in a targeted manner to improve the object identification by means of the measurement.

Further preferably, the method can comprise a characterisation of the background signal. The characterisation in particular concerns the source of the background signal. The background signal is composed in particular of signal components from different sources. The characterisation of the background signal allows certain signal components to be assigned a source, for example the sun and/or artificial light sources.

In a further aspect, the present invention relates to a device for optical distance measurement, the device comprising a transmission unit and a receiver unit and being designed to carry out an above-described method. The device is preferably a LIDAR sensor, preferably a scanning one. The device further preferably has an evaluation unit which is designed, in particular configured, to determine objects not identified by means of the measurement, preferably to determine an intensity of the background signal per receiver element, and to compare the determined intensities. The device further preferably has a control unit which is designed to control the transmission unit and/or the receiver unit and/or the evaluation unit.

The present invention further relates to a computer program product which comprises a computer-readable storage medium on which a program is stored which allows a computer, after said program has been loaded into the memory of the computer, to carry out an above-described method, where applicable in combination with an above-described device. The invention furthermore relates to a computer-readable storage medium on which a program is stored which allows a computer, after said program has been loaded into the memory of the computer, to carry out an above-described method, where applicable in combination with an above-described device.

PREFERRED EMBODIMENTS OF THE INVENTION

Figure 1:
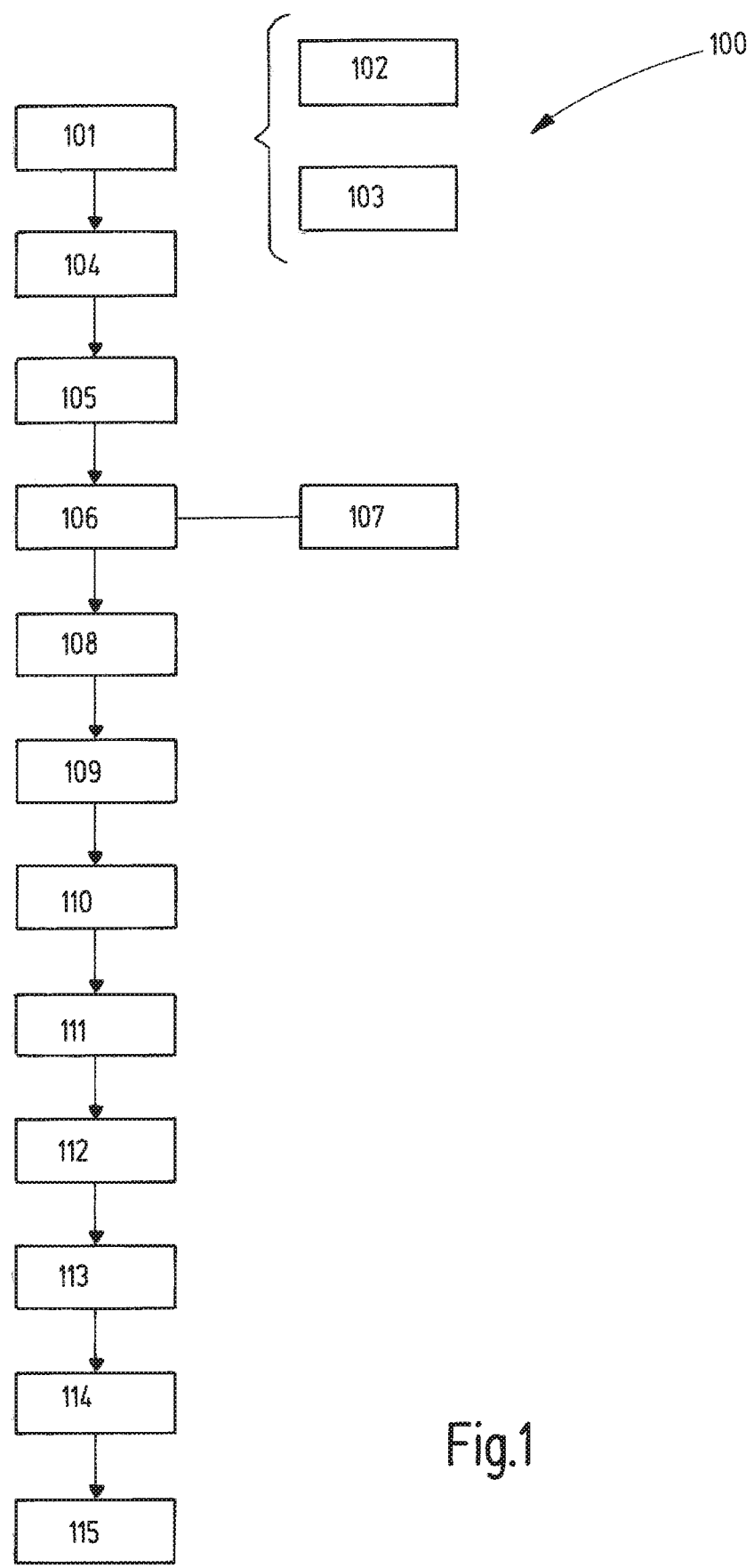
FIG. 1 schematically shows a diagram of the method according to the invention.

FIG. 1 shows a diagram of a method (100) according to the invention.

According to the method (100) according to the invention, at least one measurement is carried out (101). Carrying out (101) a measurement comprises emitting (102) measurement pulses and receiving (103) measurement pulses reflected by an object to identify (104) objects within a field of view (16) of a receiver unit (12). Further preferably, the method (100) comprises identifying (104) objects on the basis of the measurements.

The method further comprises receiving (105) a background signal with the aid of receiver elements of the receiver unit (12). An intensity (21) per receiver element is determined (106). This preferably takes place by accumulating (107) the intensity of the background signal per receiver element. Further preferably, an intensity image (20) of the field of view (16) is generated (108).

The method further comprises comparing (109) the determined intensities of the background signal of the receiver elements. Further preferably, regions (22) of minimal intensity are established (110). Advantageously, objects not identified by means of the measurement are identified (111). The identification (111) comprises in particular assigning (112) a masking (19) to a region (22) of minimal intensity. In particular, an object (18) can also be assigned (113) to a masking (19).

Moreover, the method can comprise an analysis (114) of the background signal and/or a characterisation (115) of the background signal. A corresponding analysis (114) and/or characterisation (115) of the background signal can preferably be used to infer more precisely, from a region (22) of minimal intensity or from a masking (19), the exact dimensions and/or the exact position of the object (18) which has caused the masking.

Figure 2:
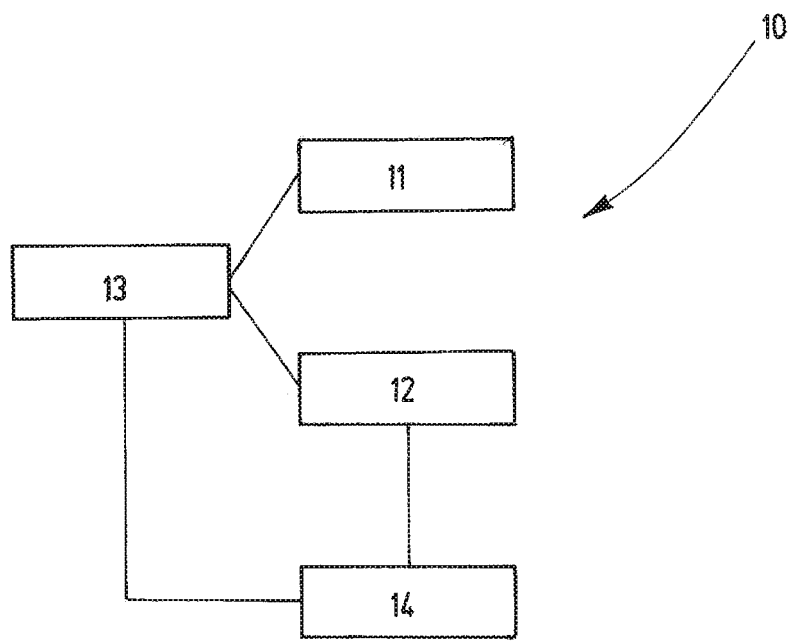
FIG. 2 schematically shows a device according to the invention.

FIG. 2 shows a device (10) for optical distance measurement which is used to carry out a method (100) according to the invention.

The device (10) comprises a transmission unit (11) comprising multiple transmission elements and a receiver unit (12) comprising multiple receiver elements. The device (10) further comprises a control unit and an evaluation unit (14). The control unit (13) is designed to control the transmission unit (11) and/or the receiver unit (12) and/or the evaluation unit (14) correspondingly. The evaluation unit (14) is in particular designed to evaluate data received from the receiver unit (12), in particular the received background signal. An evaluation includes in particular at least one, several or all of steps 106 to 115. Step 104 can also be included in the evaluation.

Figure 3:
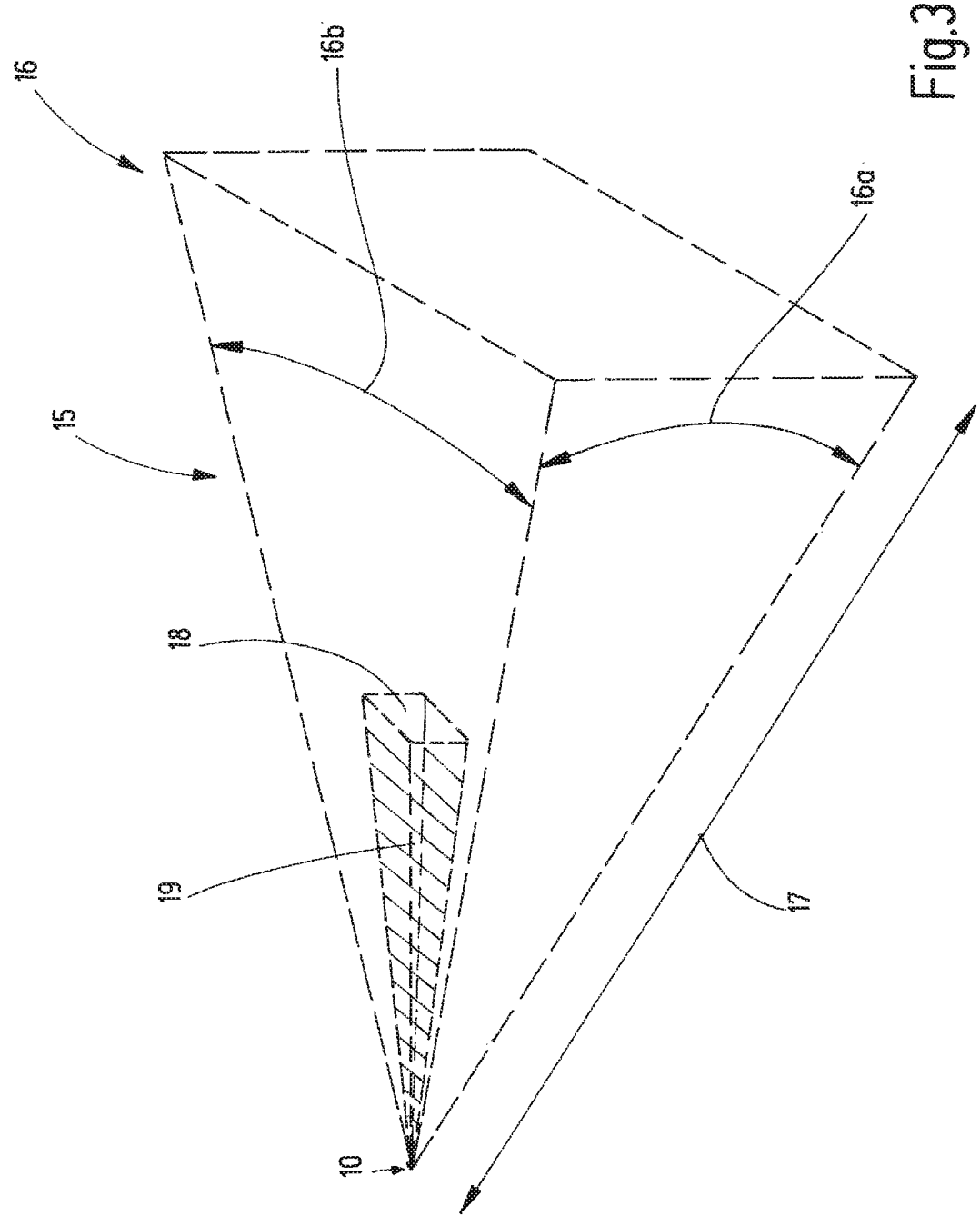
FIG. 3 schematically shows a field of view of a receiver unit.

FIG. 3 shows a field of view (16) of a receiver unit (12) of a device (10) for optical distance measurement.

The device (10) for optical distance measurement is shown as a point for simpler representation. The receiver unit (12) of the device (10) can be assigned a measurement region (15). The measurement region (15) is defined by a field of view (16) and a range (17). The range (17) is defined by a maximum distance from the device (10). The field of view (16) is spanned by two angular sectors (16a, 16b).

There is an object (18) within the measurement region (15). The object (18) masks the background signal such that a masking (19) is produced. A masking (19) means a shadow region of the background signal, caused by the object, in the direction of the device (10) or receiver unit (12).

Figure 4:
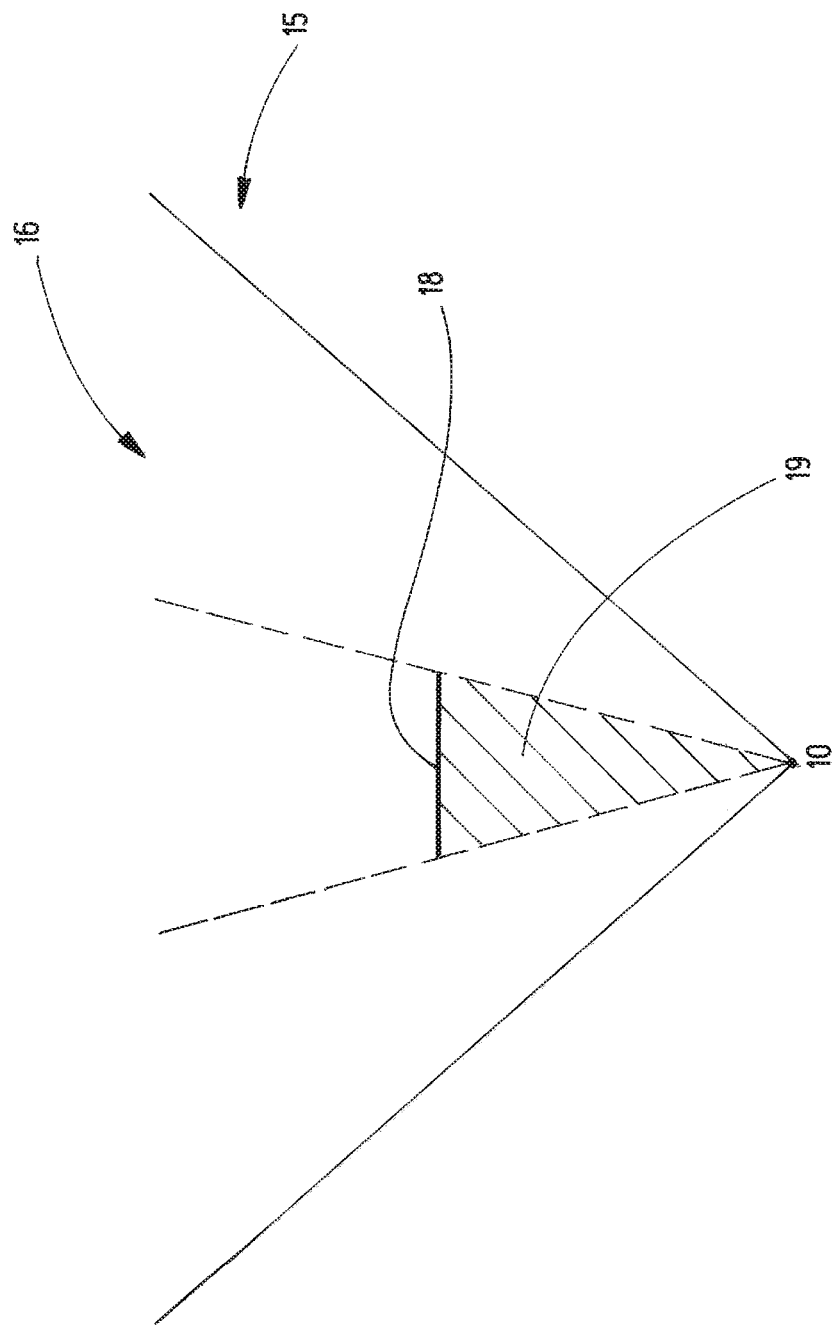
FIG. 4 schematically shows a two-dimensional view of the field of view of FIG. 3.

FIG. 4 shows a two-dimensional view of the field of view (16) of FIG. 3. It can clearly be seen from FIG. 4 how the object (18) produces a masking (19) in the direction of the device (10).

Figure 5:
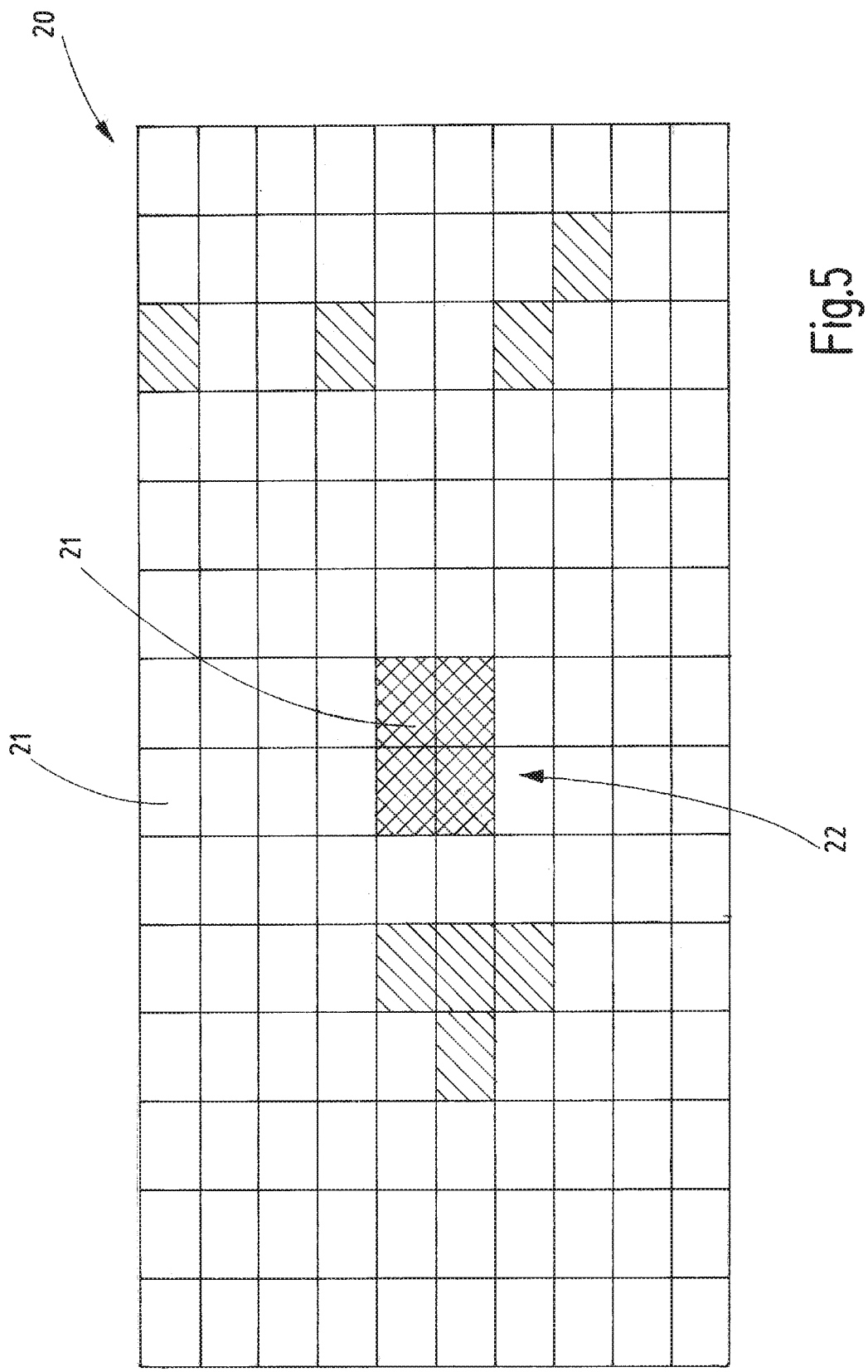
FIG. 5 schematically shows an intensity image of the background signal.

FIG. 5 shows an intensity image (20). In the intensity image (20), the determined intensity (21) per receiver element is shown. Each box shown in FIG. 5 can be assigned to a receiver element. It can clearly be seen how an object (18) or the masking (19) caused thereby produces a region (22) of minimal intensity. The region (22) of minimal intensity can be indicated from a comparison of the intensities (21) of the receiver elements. From this, a masking (19) and thus an object (18) not identified by means of the measurement can in turn be identified.

The invention claimed is:

1. A method for optical distance measurement, comprising the steps of:
    carrying out at least one measurement comprising emitting measurement pulses by means of a transmission unit and receiving measurement pulses reflected by an object by means of a receiver unit to identify objects within a field of view of the receiver unit, the receiver unit comprising receiver elements;
    receiving a background signal by means of the receiver elements;
    wherein an intensity of the background signal is determined per receiver element, wherein the determined intensities of the background signal of the receiver elements are compared in order to identify objects not identified by means of the measurement within the field of view of the receiver unit;
    wherein at least one region of minimal intensity of the background signal is determine within an intensity image of the field of view of the receiver unit;
    wherein the at least one region of minimal intensity is assigned a masking in the field of view of the receiver unit; and
    wherein the masking originates from an object not identified by means of the measurement.

2. The method according to claim 1, wherein the background signal originates from sources other than the transmission unit.

3. The method according to one of claim 1 or 2, wherein the intensity of the background signal is accumulated per receiver element in order to generate the intensity image of the field of view of the receiver unit.

4. The method according to claim 3, wherein the intensity image of the field of view of the receiver unit is generated.

5. The method according to claim 1, wherein the method comprises assigning an object not identified by means of the measurement to the masking in the field of view.

6. The method according to claim 1, wherein the method comprises identifying an object not identified by means of the measurement.

7. The method according to claim 1, wherein the method comprises analysing the background signal.

8. The method according to claim 1, wherein the method comprises characterising the background signal.

9. A device for optical distance measurement, comprising:
    a transmission unit and a receiver unit, wherein the device designed to carry out a method according to claim 1.

10. A computer program product which comprises a non-transitory computer-readable storage medium on which a program is stored which allows a computer, after said program has been loaded into the memory of the computer, to carry out a method according to claim 1.

11. A non-transitory computer-readable storage medium on which a program is stored which allows a computer, after said program has been loaded into the memory of the computer, to carry out a method according to claim 1.

* * * * *